United States Patent [19]

Haddad et al.

[11] Patent Number: 4,605,491
[45] Date of Patent: Aug. 12, 1986

[54] FCC CATALYST STRIPPING METHOD

[75] Inventors: James H. Haddad, Princeton Junction; Hartley Owen, Belle Mead, both of N.J.

[73] Assignee: Mobil Oil Corporation, New York, N.Y.

[21] Appl. No.: 632,085

[22] Filed: Jul. 18, 1984

[51] Int. Cl.4 .............................................. C10G 11/18
[52] U.S. Cl. .................................... 208/161; 208/153; 208/164
[58] Field of Search ............... 208/161, 164, 151, 152, 208/113, 147, 150, 153; 422/144

[56] References Cited

U.S. PATENT DOCUMENTS

| | | | |
|---|---|---|---|
| 2,337,684 | 12/1943 | Scheineman | 208/161 X |
| 2,502,953 | 4/1950 | Jahnig | 422/144 X |
| 2,784,803 | 3/1957 | Saxton | 208/161 X |
| 3,123,547 | 3/1964 | Palmer et al. | 208/153 X |
| 3,661,799 | 5/1972 | Cartmell | 252/417 |
| 4,043,899 | 8/1977 | Anderson et al. | 208/161 |
| 4,070,159 | 7/1978 | Myers et al. | 208/161 |
| 4,194,965 | 3/1980 | Billings et al. | 208/164 X |
| 4,219,407 | 8/1980 | Haddad et al. | 208/151 |
| 4,295,961 | 10/1981 | Fahrig et al. | 208/161 |
| 4,310,489 | 1/1982 | Fahrig et al. | 208/161 X |
| 4,404,095 | 9/1983 | Haddad et al. | 208/164 X |
| 4,448,753 | 5/1984 | Gross et al. | 208/113 X |

Primary Examiner—Andrew H. Metz
Assistant Examiner—Glenn A. Caldarola
Attorney, Agent, or Firm—Alexander J. McKillop; Michael G. Gilman; Dennis P. Santini

[57] ABSTRACT

A method and apparatus for improving the stripping of hydrocarbons from catalyst particles in a fluidized catalytic cracking (FCC) unit. A stripper vessel has catalyst particles entering at one end and stripped catalyst particles exiting at another end. While passing through the stripper, the catalyst particles are exposed to a stripping gas, in a preferred embodiment steam, at each stage. A baffle and conduit system is provided, such that after exposure to only a portion of catalyst contained above the steam injection location in the stripper, the stripping gas and any stripped hydrocarbons are removed from any further substantial catalyst contact. The short contact time (SCT) stripper, in other embodiments, can be combined with one or more of a riser conversion zone deflector, a stripper mount in or adjacent the exhaust barrel of a separator, and/or a catalyst seal pot, all serving to reduce "residence" time of hydrocarbons with catalyst particles.

8 Claims, 11 Drawing Figures

FCC CATALYST STRIPPING METHOD

BACKGROUND OF THE INVENTION

1. Field of the Invention

The present invention relates to methods and apparatus for the separation of a catalyst and hydrocarbon materials in a fluidized catalytic cracking (FCC) unit. More particularly, the present invention relates to an improved method and apparatus for reducing the contact time between catalyst and hydrocarbon materials in a stripping zone after "separation" in a conventional separator.

2. Discussion of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered, requiring refinements in processing techniques to take advantage of the high catalyst activity, selectivity and operating sensitivity.

By way of background, the hydrocarbon conversion catalyst usually employed in an FCC installation is preferably a high activity crystalline zeolite catalyst of a fluidizable particle size. The catalyst is transferred in suspended or dispersed phase condition with a hydrocarbon feed generally upwardly through one or more riser conversion zones (FCC cracking zones), providing a hydrocarbon residence time in each conversion zone in the range of 0.5 to about 10 seconds, and usually less than about 8 seconds. High temperature riser hydrocarbon conversions, occurring at temperatures of at least 1000° F. or higher and at 0.5 to 4 seconds hydrocarbon residence time in contact with the catalyst in the riser, are desirable for some operations before initiating separation of vaporous hydrocarbon product materials from the catalyst.

Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the hydrocarbon conversion zone. The entrained hydrocarbons are subjected to further contact with the catalyst until they are removed from the catalyst by a separator, which could be a mechanical means, and/or stripping gas in a separate catalyst stripping zone. Hydrocarbon conversion products separated and materials stripped from the catalyst are combined and passed to a product fractionation step. Stripped catalyst containing deactivating amounts of carbonaceous material, hereinafter referred to as coke, is then passed to a catalyst regeneration operation.

Of particular interest has been the development of methods and systems for separating catalyst particles from a gas suspension phase exiting the riser and containing catalyst particles and vaporous hydrocarbon product materials, particularly the separation of high activity crystalline zeolite cracking catalysts, under more efficient separating conditions so as to reduce overcracking of hydrocarbon conversion products and promote the recovery of desired products of a hydrocarbon conversion operation. Cyclonic equipment is now typically used for efficient separation of fluidizable catalyst particles from the gas suspension phase. However, present day cyclonic equipment often permits an undesirable extended residence time of the product vapor within a large reactor vessel. This extended residence time reduces the desired product yield by as much as 4% through non-selective thermal cracking. Recent developments in this art have been concerned with the rapid separation and recovery of entrained catalyst particles from the gas suspension phase.

Various processes and mechanical means have been employed heretofore to effect rapid separation of the catalyst phase from the hydrocarbon phase at the termination of the riser cracking zone, to minimize contact time of the catalyst with cracked hydrocarbons. A representative one of these is shown in FIG. 1 and discussed below by way of general background for the present invention.

FIG. 1 in the present application corresponds to a simplified illustration of FIG. 2 from Anderson et al, U.S. Pat. No. 4,043,899, where similar reference numbers have been utilized to illustrate similar structures in the two figures. Anderson et al discloses a method for rapid separation of a product suspension, comprising the vaporous hydrocarbon product phase and fluidized catalyst particles (HYC+CAT, as seen entering riser conversion zone 24), by discharging the entire suspension directly from the riser conversion zone into a cyclone separation zone 4. The cyclone is modified to include a separate cyclonic stripping of the catalyst separated from the hydrocarbons vapors in an auxiliary stripper. The cyclone separator is modified to include an additional downwardly extending section comprising a lower cyclone stage 11. In this arrangement, catalyst separated from the gasiform material in the upper stage of the cyclone, slides along a downwardly sloping helical baffle 12 to the lower cyclone, where stripping steam (STM) is introduced to further separate entrained hydrocarbon products from the catalyst recovered from the upper cyclone. The steam and stripped hydrocarbons are passed from the lower cyclone through a concentric pipe 8, where they are combined with the hydrocarbon vapors separated in the upper cyclone.

The separated, stripped catalyst is collected and passes from the cyclone separator 4 by conventional means through a dipleg 22 into a catalyst bed 60 in the bottom of reactor vessel 26 and out catalyst exit 44. This lower portion of vessel 26 also acts as a catalyst stripping section, comprising baffles 32, 34, and 36, with steam being supplied to the catalyst bed thereunder. Vaporous material separated in cyclone 4 can also be discharged into cyclone 52 and subsequently passed by way of conduit 54 into chamber 46 and withdrawn therefrom by conduit 48 for eventual fractionation.

While the Anderson et al patent, along with U.S. Pat. No. 4,219,407 to Haddad et al (herein incorporated by reference), represent improvements in the field of rapidly stripping of hydrocarbon materials from catalyst particles, there is still a need to further reduce total contact time between hydrocarbon materials and catalysts to reduce, to the extent possible, non-selective cracking. Thus, although a substantial amount of catalyst stripping occurs in catalyst bed 60, the stripped hydrocarbon material still contacts with additional catalyst particles as it is carried upward through the catalyst bed and into the entrance of cyclone 52 and from there to chamber 46 and eventual fractionation. This increased hydrocarbon material/catalyst contact contributes to uncontrolled and undesired cracking of the hydrocarbon materials.

It can be seen that at each stripper stage in FIG. 1, represented by baffles 32, 34 and 36, the hydrocarbon materials stripped from catalyst in the lower portion of vessel 26 undergo further catalyst contact while making their way to the surface of the catalyst bed. Because the catalyst bed acts as a lower seal to the dipleg 22 (and thus prevents the flow of hydrocarbon-laden gas through dipleg 22 into the catalyst bed), often the dipleg must be extended deep within the catalyst bed in order to provide a sufficient seal. This depth requirement, plus the desirability of multistage stripping (in order to ensure that a high percentage of hydrocarbon material is removed from the catalyst particles) requires a rather substantial volume of catalyst in the catalyst bed 60, which volume serves to increase the uncontrolled residence time of hydrocarbon material with catalyst particles.

SUMMARY OF THE INVENTION

It is an object of the present invention to provide an improved method and apparatus for catalyst stripping, whereby stripped hydrocarbon vapors have minimum contact with catalyst particles within a stripping zone.

It is an additional object of the present invention to provide an improved method and apparatus for rapidly stripping entrained hydrocarbon vapors and hydrocarbon material contained on and within catalyst particles immediately upon separation in a particle separator.

In its method aspects, the invention achieves the foregoing objects by the steps of passing a separated catalyst through a stripper vessel having an entrance, a catalyst exit and a stripped hydrocarbon exit; causing the separated catalyst to follow a circuitous path from the entrance through the stripper vessel to the catalyst exit; injecting a stripping gas so that it contacts with only a portion of the separated catalyst located above the injecting location and between the injecting location and stripped hydrocarbon exit; and passing the stripper gas and hydrocarbons stripped from the separated catalyst directly to the stripped hydrocarbon exit.

In its apparatus aspects, the invention achieves the foregoing objects in a catalyst stripper comprising: a stripper vessel; baffle means for causing the separated catalyst to follow a circuitous path from the entrance of the stripper vessel through at least one stripping stage towards a catalyst exit therein; means for injecting stripper gas into the separated catalyst at at least one location in each stripping stage; and means for passing the stripper gas and stripped hydrocarbons at each stage to a stripped hydrocarbon exit, the baffle means, the stripper gas injection means and the passing means, combining to form a means for exposing the stripper gas to only a portion of the separated catalyst above an injection location in each stripping stage.

The invention, in both its method and apparatus aspects, can be configured as an original installation, or as a retrofit to an existing fluid catalytic cracking reactor system.

BRIEF DESCRIPTION OF THE DRAWINGS

A more complete appreciation of the invention, and many of the attendant advantages thereof, will be readily apparent as the same becomes better understood by reference to the accompanying drawings, wherein:

FIG. 2b is a side view of the subject matter in FIG. 2a;

DETAILED DESCRIPTION OF PREFERRED EMBODIMENTS

Figure 2A:
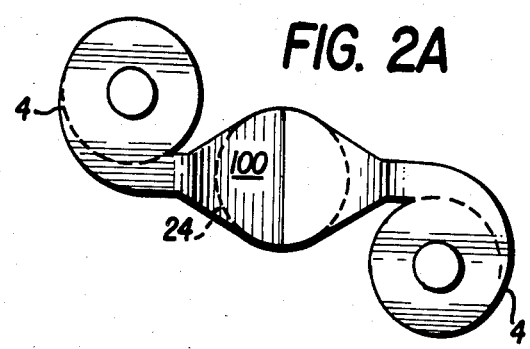
FIG. 2a is a top view of a riser conversion zone illustrating the connection to two cyclone separators.
Figure 2B:
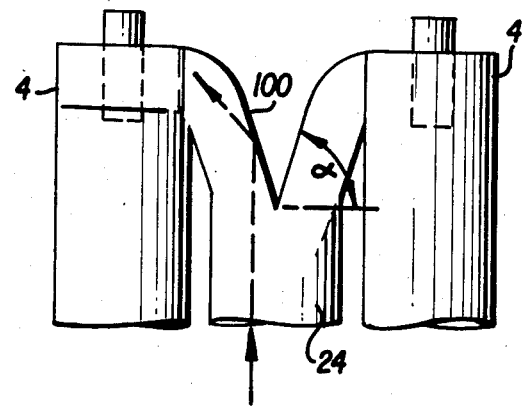
Figure 8:
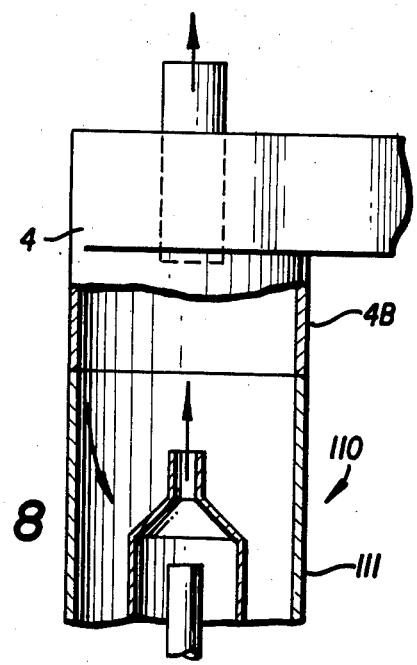
FIG. 8 is a side view partially in section of a short contact time catalyst stripper located adjacent the exhaust barrel of a cyclone separator in accordance with one embodiment of the present invention.
Figure 9:
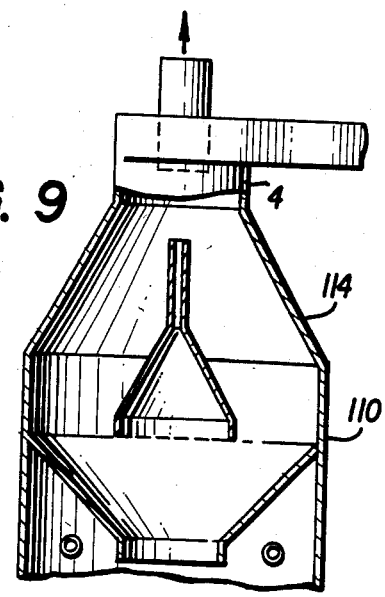
FIG. 9 is a side view partially in section of a modified cyclone separator exhaust barrel and its interconnection with a short contact time stripper in accordance with the present invention.
Figure 10:
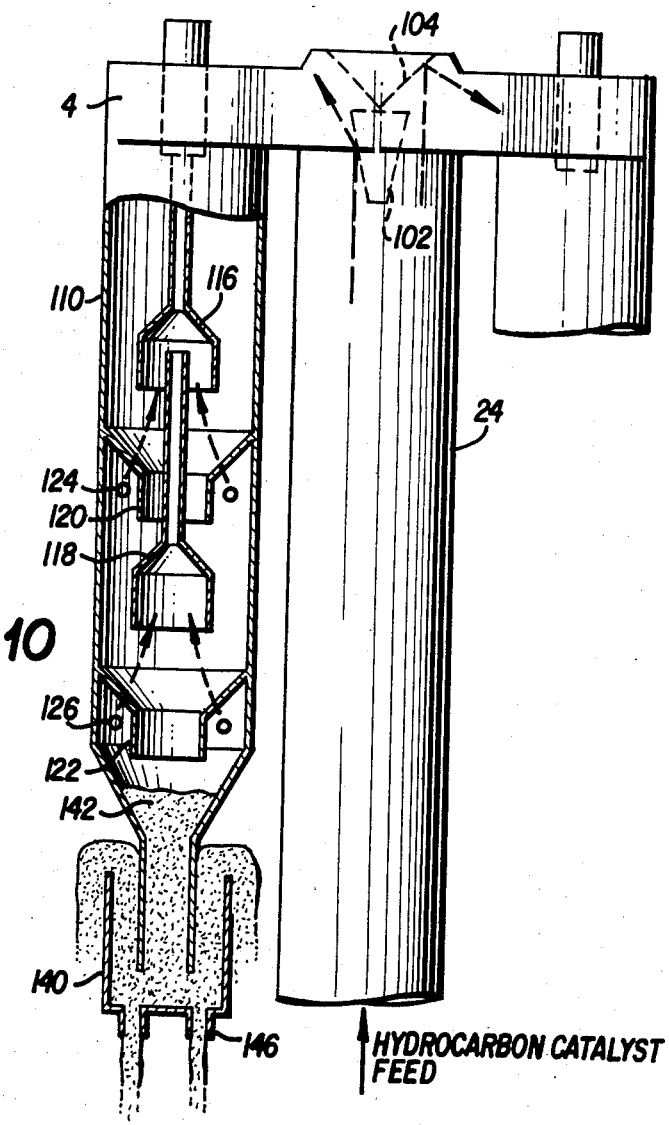
FIG. 10 is a side view partially in section illustrating one embodiment of the present invention in which baffles serve to deflect catalyst particles into the inlet of a cyclone separator which is immediately adjacent a two-stage short contact time stripper whose lower end is sealed by a catalyst seal pot, all in accordance with the present invention.

The present invention is directed towards an improved short contact time stripper as a method and apparatus for reducing uncontrolled cracking, and various embodiments thereof are shown in and described with reference to FIGS. 3, 4 and 8-10. Also discussed in the present specification is a catalyst particle deflector as a method and apparatus for reducing uncontrolled cracking, as illustrated in FIGS. 2a, 2b and 10, and discussed and claimed in a copending U.S. patent application entitled "Improved FCC Catalyst Separation Method and Apparatus" Ser. No. 632,084, filed 7-18-84, executed and filed concurrently herewith. The catalyst particle deflector can be used, as described below, in combination with the short contact time stripper. Additionally discussed is a method and apparatus for additionally reducing uncontrolled cracking by providing a stripper adjacent the exhaust barrel of a separator, as shown in FIGS. 8-10, and discussed and claimed in a copending U.S. patent application entitled "Method and Apparatus for Reducing Overcracking During FCC Catalyst Separation" Ser. No. 632,086 filed 7-18-84 executed and filed concurrently herewith. The exhaust barrel stripper concept can also be used in connection with the short contact time stripper, as described below. Also discussed and claimed in "Method and Apparatus for Reducing Overcracking During FCC Catalyst Separation" is a further method and apparatus for reducing uncontrolled cracking by utilizing a catalyst seal pot, which is illustrated in the present case in FIGS. 6, 7 and 10. This catalyst seal pot can also be used with the short contact time stripper, as discussed below. Because each of these methods and apparatus can be utilized separately or in various combinations, a discussion of each and their interaction follows, beginning with the short contact time stripper.

Figure 1:
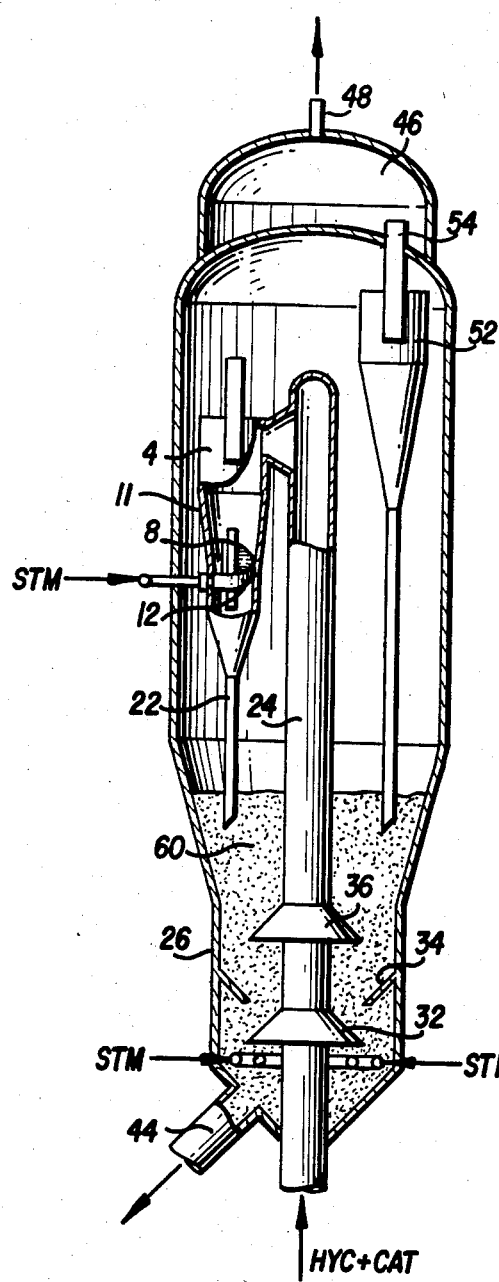
FIG. 1 is a diagrammatic sketch of the riser reactor, including catalyst stripping zone, illustrated in FIG. 2 of U.S. Pat. No. 3,043,899 to Anderson et al.
Figure 5:
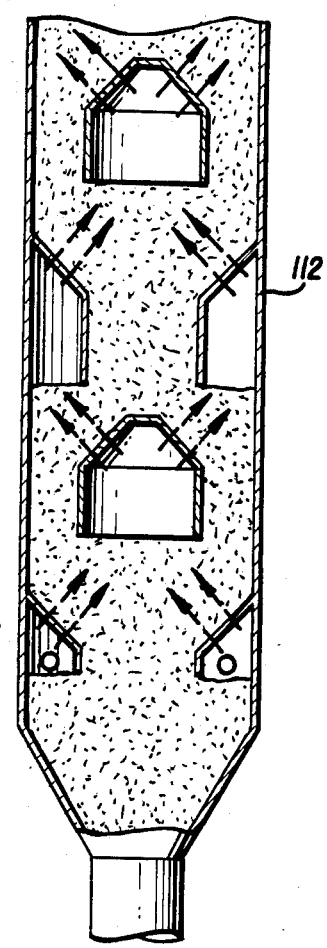
FIG. 5 is a side view partially in section of a four-stage countercurrent stripper which can be directly connected with the exhaust barrel of the cyclone separator illustrated in FIGS. 2a and 2b.

Referring now more particularly to the drawings, wherein like numerals represent like elements throughout the several views, FIG. 1 illustrates a conventional three-stage counter-current catalyst stripper located at the lower portion 26 of a reactor vessel, while FIG. 5 illustrates a conventional four-stage counter-current stripper, although configured to be attached to a separator exhaust barrel. The number of stages is defined by the number of baffle levels, while counter-current denotes the opposite directions of catalyst and stripping gas flow. Steam entering by injectors at the lower portion of these conventional strippers must carry stripped hydrocarbons through the entire catalyst bed before upwardly exciting the stripper vessel. This extended uncontrolled contact of catalyst and hydrocarbons results in overcracking of the hydrocarbons.

Figure 3:
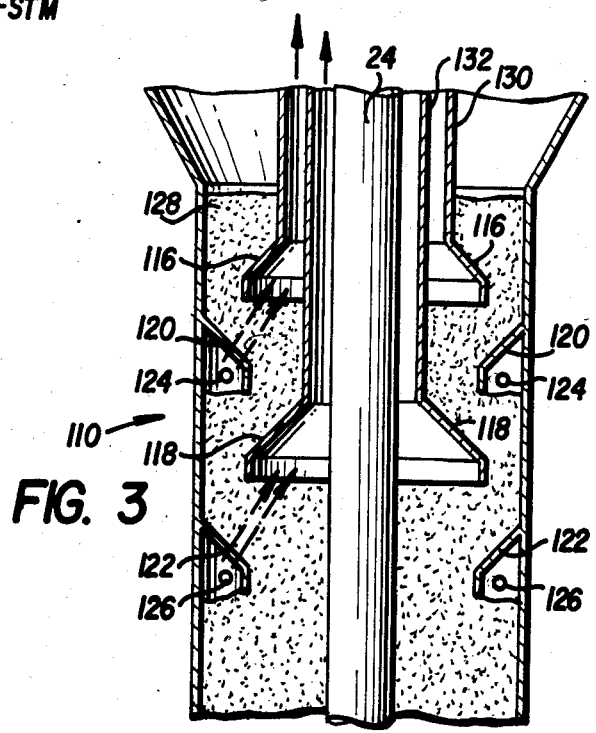
FIG. 3 is a side view partially in section of one embodiment of a short contact time catalyst stripper in accordance with the present invention.

The present invention seeks to maintain hydrocarbon vapor and hydrocarbon materials stripped from catalyst separate and apart from contact with other catalyst particles in order to prevent additional uncontrolled cracking. FIG. 3 illustrates one embodiment of a short contact time (SCT) stripper 110, which is located concentrically around a riser conversion zone 24. A hydrocarbon/catalyst feed ascends vertically through the riser conversion zone 24, is passed through a suitable separator, e.g., a cyclone separator, is passed from the outlet of the separator to enter the upper portion of the SCT stripper 110, and descends toward a lower portion thereof. Baffles 116 and 118 serve to direct the descending separated catalyst particles towards perforated baffles 120 and 122. Steam is provided at outlets 124 and 126 in the conventional manner and travels through only a portion of the flowing catalyst particles 128. The "portion" referred to is that catalyst located between the steam injection point and the intake of the inverted funnels. Since the steam does not flow through the catalyst particles above its associated funnel intake, it does not place the hydrocarbons entrained therewith in further contact with catalysts. Although all catalyst is contacted with steam, a given portion of the steam, and hydrocarbon materials entrained therewith, does not contact all catalyst contained above the steam injection point.

It can be seen in FIG. 3 that the hydrocarbon material stripped from catalyst particles by the stripping steam is relatively quickly separated from further contact with catalyst particles, due to baffles 116 and 118 which serve as inverted funnels forcing the steam and carried hydrocarbon vapors into concentric pipes 130 and 132 for either further separation and/or stripping or fractionation (not shown). In the vertical arrangement shown in FIG. 3, the baffles 116 and 118 serve to move the catalyst particles in at least a partially horizontal direction, with perforated baffles 120 and 122 doing likewise. The descending catalyst particles 128 follow a circuitous route around the baffles, which permits a number of steam exposure locations or "stages."

Figure 4:
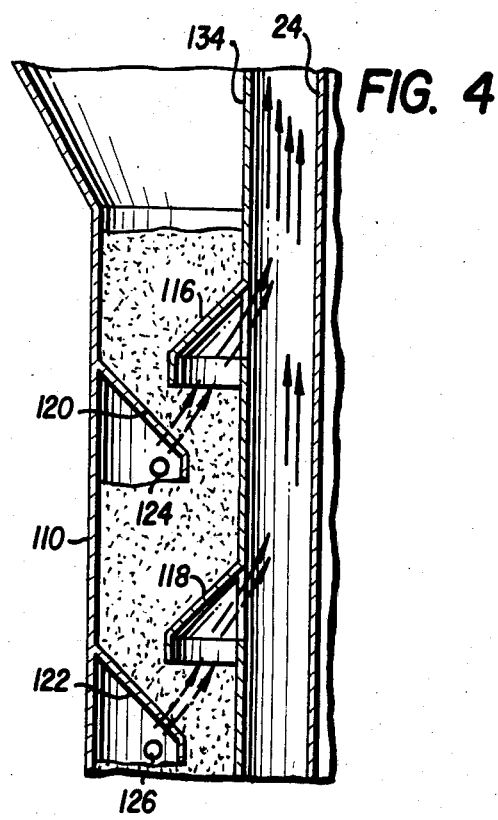
FIG. 4 is a side view partially in section of a further embodiment of a short contact time catalyst stripper in accordance with the present invention.

Although the SCT stripper 110, shown in FIG. 3, is mounted concentrically around the hydrocarbon feed riser 24, the stripper could also be mounted separate and apart from the hydrocarbon feed riser, as shown, for example, in FIG. 10, where a catalyst stripper is located in the exhaust barrel of a separator. Furthermore, although two stages of steam injection are shown in FIG. 3, more or less stages could be added, depending on the desired amount of stripping and the desired level of complexity. Additionally, there is no requirement that the stripped hydrocarbon vapors be carried in separate conduits 130 and 132, as shown in FIG. 3. For example, as shown in FIG. 4, a single conduit 134 could be utilized in conjunction with baffles 116 and 118 and perforated baffles 120 and 122, in the manner similar to that discussed with reference to FIG. 3. However, it should be noted that although FIG. 4 illustrates an SCT stripper which includes the riser conversion zone 24 concentrically mounted therein, there is no requirement for a concentric riser location. Thus, like FIG. 3, the FIG. 4 stripper could be mounted elsewhere. The FIG. 4 type SCT stripper, without a concentric riser location, is illustrated in FIG. 10. It is understood that conduits 130 and 132 in FIG. 3 and 134 in FIG. 4 would conduct the stripped hydrocarbon vapors away from further contact with catalyst particles in order to avoid increased "residence" or "contact" time. Thus, the injected stripping gas, which is steam in a preferred embodiment, contacts only a portion of the catalyst in the stripper and is conveyed away without additional catalyst contact.

In order to ensure that hydrocarbon vapors released in the stripper travel through the appropriate stripper exhaust conduit (conduits 130 and 132 in FIG. 3 and 134 in FIG. 4), it is necessary that the bottom of the strippers provide a sufficient resistance to gas flow in the downward direction. However, the lower portions cannot be completely sealed, as the catalyst particles gathering in the lower portion of the stripper must be removed for recycling and reuse in the reactor.

Figure 6:
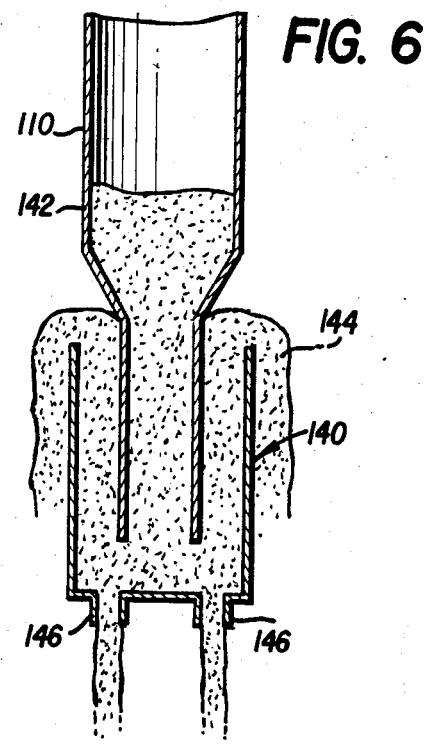
FIG. 6 is a side view partially in section of one embodiment of a catalyst seal pot.

In the past, the catalyst bed 60 served to provide a sufficient pressure differential to force gas flow in the desired direction. However, the large volume of catalyst in the bed and the requirement that the catalyst level extend to any separator dipleg (as in FIG. 1) provided additional catalyst through which injected stripping gas and separated hydrocarbons must pass, thus providing additional "residence" time and a further level of uncontrolled cracking for hydrocarbons in contact or entrained with the catalyst particles. Consequently, in a further embodiment of the present invention, the lower portion of the SCT stripper unit is received into a catalyst seal pot 140, as shown in FIGS. 6 and 10. FIGS. 6 and 10 illustrate a seal pot which can be utilized for sealing a stripper unit having an inlet at the exhaust barrel of a cyclone separator. The level of catalyst 142 in the stripper is maintained (above, at or below the stripper steam injection location), such that the gas flow resistance from the catalyst level 142 through the seal pot and to the overflowing catalyst 144, is sufficient to prevent substantial hydrocarbon-laden steam flow therethrough. However, the volume of catalyst contained in the seal pot 140 is relatively small, such that any hydrocarbon-laden steam which is entrained therein does not have the long "residence" time expected of the normal catalyst bed/dipleg seals.

Figure 7:
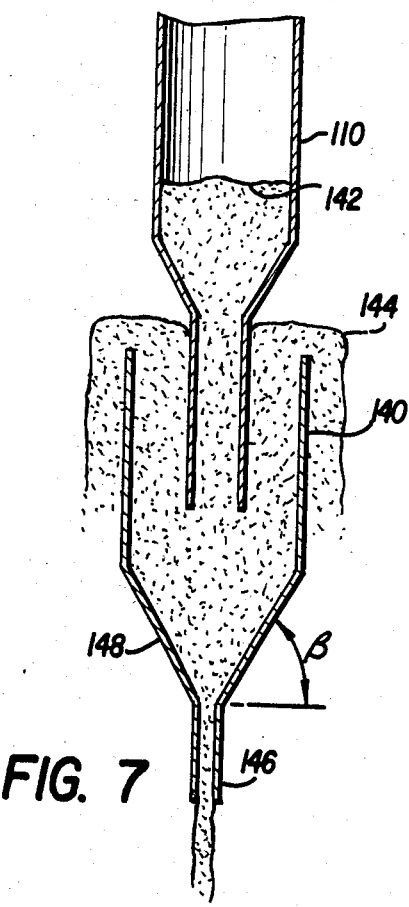
FIG. 7 is a side view partially in section of a further embodiment of a catalyst seal pot.

Catalyst seal pot 140 has one or more drains 146 sized so as to permit a flow of catalyst at least equal to between 10 and 90% and preferably to between 30 and 50% of the catalyst flow rate through the catalyst seal pot. The remainder of the catalyst not flowing through drains 146 overflows the catalyst seal pot at 144, whereupon the overflowing and draining catalysts are recovered and reused. FIG. 6 illustrates a two drain seal pot, with FIG. 7 showing a single drain seal pot. In FIG. 7, the bottom of the seal pot has sloping sides 148, which serve to ensure that no catalyst will remain trapped within the seal pot and that ultimately all catalyst will drain or overflow therefrom. Although the angle $\beta$ of the sloping sides 148 is not critical, the optimum angle would appear to be 60°.

The present invention can be used in conjunction with a unique riser deflector which assists in moving catalyst particles, along with hydrocarbon vapors, toward the exit of riser 24. FIGS. 2a and 2b illustrate such a catalyst deflector. As shown in FIG. 2b, A V-shaped or conical deflector 100 at the top of riser 24 transforms the upward velocity vectors of catalyst particles and hydrocarbon feed to a direction towards the inlets of cyclone separators 4. In a conventional riser outlet arrangement, where the cyclone inlet is located below the top of the riser conversion zone 24, as illustrated in FIG. 1, catalyst particles impact against the closed top of the riser and rebound back towards the riser conversion zone. Thus, the velocity of the rebounding particles must be reduced by dynamic pressure of the rising hydrocarbon feed before they will again move upwardly and ultimately into the inlet of cyclone separator 4. This additional "residence" time (the time during which the catalyst is in immediate contact with hydrocarbon vapor and hydrocarbon material) causes overcracking and loss of precise control of the cracked products. With deflector 100, the particle trajectories are as illustrated by the dotted line arrow in FIG. 2b, which reduces residence time due to the rebounding of catalyst particles.

In one embodiment of the deflector, the angle $\alpha$ of the deflector surface with respect to the horizontal (for a vertical riser) is between 60° and 70°, although different angles could be utilized, depending upon the location of the cyclone separator inlet with respect to the deflector, the diameter of the riser, the distance from the riser to the separator inlet, etc. Furthermore, existing risers may be converted by the addition of baffle-type deflectors 102 and/or 104, as shown in FIG. 10.

The surface of deflector 100 need not be planar and a smoothly contoured curve from the lowest point of the deflector to the upper surface of the cyclone separator 4 inlet would be advantageous, not only in the redirection of catalyst particle travel, but also to reduce any pressure drop which may be encountered between the upper portion of riser conversion zone 24 and the cyclone separator 4. Likewise, baffle-type deflectors 102 and/or 104 could also be curved to direct the catalyst-/hydrocarbon vapor to separator 4.

While a cyclone separator 4 has been illustrated for use with deflector 100, deflector 100 could be equally useful with many other types of separators which are known to those in the fluid catalytic cracking art.

Once the catalyst particles have been separated in the cyclone separator 4, it is desirable to strip any hydrocarbon vapor contained in voids between catalyst particles and within the pores of the catalyst particles themselves as soon as possible. In accordance with another embodiment of the present invention, the SCT catalyst stripper can be mounted in the separator exit barrel or adjacent thereto. For example, a portion of the short contact time (SCT) stripper 110 could be located completely within the existing exhaust barrel of a cyclone separator 4, as shown in FIG. 10, or, as shown in FIG. 8, the entrance of the short contact time (SCT) stripper 110 can be located adjacent the exit barrel 4B of cyclone separator 4. Separated catalyst particles exiting the cyclone separator 4 will immediately be processed by the catalyst stripper, reducing to an absolute minimum additional contact time between the catalyst particles and hydrocarbon vapors.

Depending on the specifics of the stripper and the separator designs utilized, a conical section 114, or some other section joining the stripper to the separator exhaust, could be utilized as illustrated in FIG. 9. FIG. 9 illustrates the combination of a conical diffuser connecting the exit barrel of cyclone separator 4 with the inlet of SCT stripper 110.

The present invention can be combined with at least three other method and apparatus improvements disclosed in the aforementioned copending applications, which serve to reduce the "residence" time during which hydrocarbon materials are in contact with catalyst particles. Various combinations of these improvements could be added to a SCT stripper equipped fluid catalytic cracking method or system, with corresponding improvements in operating efficiency. All of these improvements could be utilized in a single fluid catalytic cracking process or apparatus, such as that illustrated in FIG. 10, which includes the catalyst particle deflectors 102 and 104, the catalyst stripper located in the barrel of cyclone separator 4, and the use of a two-stage short contact time stripper, sealed with a low volume catalyst seal pot 140.

Although the present invention has been described relative to a number of spcific embodiments thereof, it is not so limited and many modifications and variations thereof will be readily apparent to those skilled in the art in light of the above teachings. It is, therefore, to be understood that within the scope of the appended claims the invention may be practiced otherwise than as specifically described.

The embodiments of the invention in which an exclusive property or privilege is claimed are defined as follows:

1. A method of stripping hydrocarbons from separated catalyst in a fluid catalytic cracking process, said method comprising the steps of:
   passing said separated catalyst through a stripper vessel having an entrance, a catalyst exit and a stripped hydrocarbon exit:
   causing said separated catalyst to follow a circuitous path concentrically around a riser conversion zone while flowing from said entrance through said stripper vessel to said catalyst exit;
   injecting a stripping gas at a plurality of stages such that stripping gas injected at one stage is exposed to only a portion of said separated catalyst above the stripping gas injecting location and moves through said portion in a direction having a net radial component and is mixed with stripping gas from another stage when passing through said stripped hydrocarbon exit; and
   passing said stripping gas and hydrocarbons strippe d from said separated catalyst directly to said stripped hydrocarbon exit.

2. A method of stripping hydrocarbons from separated catalyst in a fluid catalytic cracking process, said method comprising the steps of:
   passing said separated catalyst through a stripper vessel having an entrance, a catalyst exit and a stripped hydrocarbon exit;

causing said separated catalyst to follow a circuitous path from said entrance through said stripper vessel to said catalyst exit;

injecting a stripping gas so that it contacts with only a portion of said separated catalyst that is above the stripping gas injecting location and moves through said portion in a direction having a net radial component and located between said location and stripped hydrocarbon exit; and passing said stripping gas and hydrocarbons stripped from said separated catalyst directly to said stripped hydrocarbon exit, wherein said injecting step comprises injecting said stripping gas at a plurality of stages such that said stripping gas at one stage is exposed to only a portion of said separated catalyst and is not exposed to stripping gas from another stage in said stripper vessel when passing through said stripped hydrocarbon exit.

3. The method according to claim 2, wherein said causing step further includes the step of causing said catalyst to flow concentrically around a riser conversion zone while flowing from the entrance to the catalyst exit through said stripper vessel.

4. The method according to one of claims 1, 2 or 3, wherein after said passing steps there is further provided the additional step of passing said separated catalyst through a dipleg into a catalyst seal pot including at least one drain so as to permit between 10 and 90% of catalyst flowing through ssaid stripper to flow out of said seal pot through said drain.

5. A method of stripping hydrocarbons from separated catalyst in a fluid catalytic cracking process, said method comprising the steps of:

passing a mixture, as a suspension, of hydrocarbon feed and a catalyst through a riser conversion zone contained within a reactor vessel and cracking said hydrocarbon feed in the riser conversion zone;

passing said mixture through a deflection zone in which said catalyst is physically deflected towards an exit of said deflection zone;

passing said mixture from said deflection zone exit to a separation zone;

separating at least a portion of said catalyst from the mixture in said separation zone;

passing said separated catalyst through a stripper vessel having an entrance, a catalyst exit and a stripped hydrocarbon exit;

causing said separated catalyst to follow a circuitous path from said entrance through said stripper vessel to said catalyst exit;

injecting a stripping gas so that it contacts with only a portion of said separated catalyst that is above the stripping gas injecting location and located between said location and stripped hydrocarbon exit; and passing said stripping gas and hydrocarbons stripped from said separated catalyst directly to said stripped hydrocarbon exit.

6. A method of stripping hydrocarbons from separated catalyst in a fluid catalytic cracking process, said method comprising the steps of:

separating a cracked hydrocarbon feed in a separator into a gaseous effluent and a separated catalyst;

immediately passing said separated catalyst from said separator into an entrance of a stripper vessel having a catalyst exit and a stripped hydrocarbon exit;

passing said separated catalyst through a stripper vessel having an entrance, a catalyst exit and a stripped hydrocarbon exit;

causing said separated catalyst to follow a circuitous path from said entrance through said stripper vessel to said catalyst exit;

injecting a stripping gas so that it contacts with only a portion of said separated catalyst that is above the stripping gas injecting location and located between said location and stripped hydrocarbon exit; and passing said stripping gas and hydrocarbons stripped from said separated catalyst directly to said stripped hydrocarbon exit.

7. A method of stripping hydrocarbons from separated catalyst in a fluid catalytic cracking process, said method comprising the steps of:

passing said separated catalyst through a stripper vessel having an entrance, a catalyst exit and a stripped hydrocarbon exit;

causing said separated catalyst to follow a circuitous path from said entrance through said stripper vessel to said catalyst exit;

injecting a stripping gas so that it contacts with only a portion of said separated catalyst that is above the stripping gas injecting location and located between said location and stripped hydrocarbon exit;

passing said stripping gas and hydrocarbons stripped from said separated catalyst directly to said stripped hydrocarbon exit; and passing said separated catalyst through a dipleg into a catalyst seal pot including at least one drain so as to permit between 10 and 90% of catalyst flowing through said stripper to flow through said drain.

8. The method according to one of claims 1, 2, 3, 4, 5, 6 or 7, wherein said injecting step comprises injecting steam as said stripping gas.

* * * * *